(12) United States Patent
Vaknin et al.

(10) Patent No.: US 12,007,948 B1
(45) Date of Patent: Jun. 11, 2024

(54) SIMILARITY BASED COMPRESSION

(71) Applicant: VAST DATA LTD., Tel Aviv (IL)

(72) Inventors: Yogev Vaknin, Tel Aviv (IL); Eli Malul, Tel Aviv (IL); Niko Farhi, Tel Aviv (IL); Lior Klipper, Tel Aviv (IL); Alon Berger, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/877,946

(22) Filed: Jul. 31, 2022

(51) Int. Cl.
*G06F 16/174* (2019.01)

(52) U.S. Cl.
CPC ...... *G06F 16/1744* (2019.01); *G06F 16/1752* (2019.01)

(58) Field of Classification Search
CPC .................... G06F 16/1744; G06F 16/1752
See application file for complete search history.

(56) References Cited

U.S. PATENT DOCUMENTS

| | | | | |
|---|---|---|---|---|
| 9,141,632 B1* | 9/2015 | Ramesh | .................. | G06F 16/13 |
| 9,385,749 B1* | 7/2016 | Nam | ...................... | H03M 7/607 |
| 9,514,146 B1* | 12/2016 | Wallace | ............ | G06F 16/24561 |
| 10,013,200 B1* | 7/2018 | Shveidel | ............... | G06F 3/0613 |
| 2002/0191692 A1* | 12/2002 | Fallon | ................. | H03M 7/6094 |
| | | | | 375/240 |
| 2009/0187586 A1* | 7/2009 | Olson | ...................... | H03M 7/30 |
| 2010/0250480 A1* | 9/2010 | Cherkasova | ............. | G06N 5/02 |
| | | | | 706/46 |
| 2013/0054835 A1* | 2/2013 | Sliger | ................... | H04L 67/131 |
| | | | | 709/247 |
| 2013/0179411 A1* | 7/2013 | Amit | ....................... | H03M 7/30 |
| | | | | 707/693 |
| 2014/0244604 A1* | 8/2014 | Oltean | ................ | H03M 7/3091 |
| | | | | 707/693 |
| 2017/0038978 A1* | 2/2017 | Li | .......................... | G06F 3/0611 |
| 2017/0123676 A1* | 5/2017 | Singhai | ................. | G06F 3/0608 |
| 2018/0138921 A1* | 5/2018 | Arelakis | ............. | H03M 7/3071 |
| 2019/0243780 A1* | 8/2019 | Gopal | .................. | G06F 12/0811 |
| 2019/0379394 A1* | 12/2019 | Hallak | ................ | G06F 16/1744 |
| 2021/0034598 A1* | 2/2021 | Arye | ...................... | G06F 16/288 |
| 2021/0036714 A1* | 2/2021 | Martin | ................ | H03M 7/6064 |
| 2022/0197527 A1* | 6/2022 | Nomura | ................ | G06F 3/0641 |
| 2023/0023136 A1* | 1/2023 | Pinho | .................. | H03M 7/6064 |
| 2023/0251787 A1* | 8/2023 | Klipper | .................... | G06F 3/064 |
| | | | | 711/101 |

* cited by examiner

*Primary Examiner* — Hosain T Alam
*Assistant Examiner* — Robert F May
(74) *Attorney, Agent, or Firm* — Reches Patents

(57) ABSTRACT

A method for compressing an evaluated chunk (EC), the method includes (i) selecting a compressing scheme (SC) of a set of candidate SCs to provide a selected SC; and (ii) compressing the EC using the selected SC to provide a compressed EC. A similar chunk that is similar to the EC is tied to a reference chunk (RC) by having the similar chunk compressed based on the RC. The selecting includes evaluating candidate SCs of the set. The selecting is responsive to a first relationship between (i) a similarity score indicative of a similarity between the EV chunk and the similar chunk, and (ii) a similarity score indicative of a similarity between the similar chunk and the RC. A first candidate SC of the set includes untying the similar chunk from the RC, and tying the EV to the similar chunk. A second candidate SC of the set includes self-compressing the EV without tying the EV to the similar chunk.

17 Claims, 3 Drawing Sheets

SIMILARITY BASED COMPRESSION

TECHNICAL FIELD

The present disclosure generally relates to the field of data storage, and more particularly to similarity compression.

BACKGROUND

Storage systems are required to store vast amounts of data.

There is a growing need to improve the utilization of storage systems and allow the storage systems to store increasing amount of data by effectively compressing data stored in the storage system.

SUMMARY

There may be provide a storage system, a method and a non-transitory computer readable medium for similarity compressing a data chunk.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
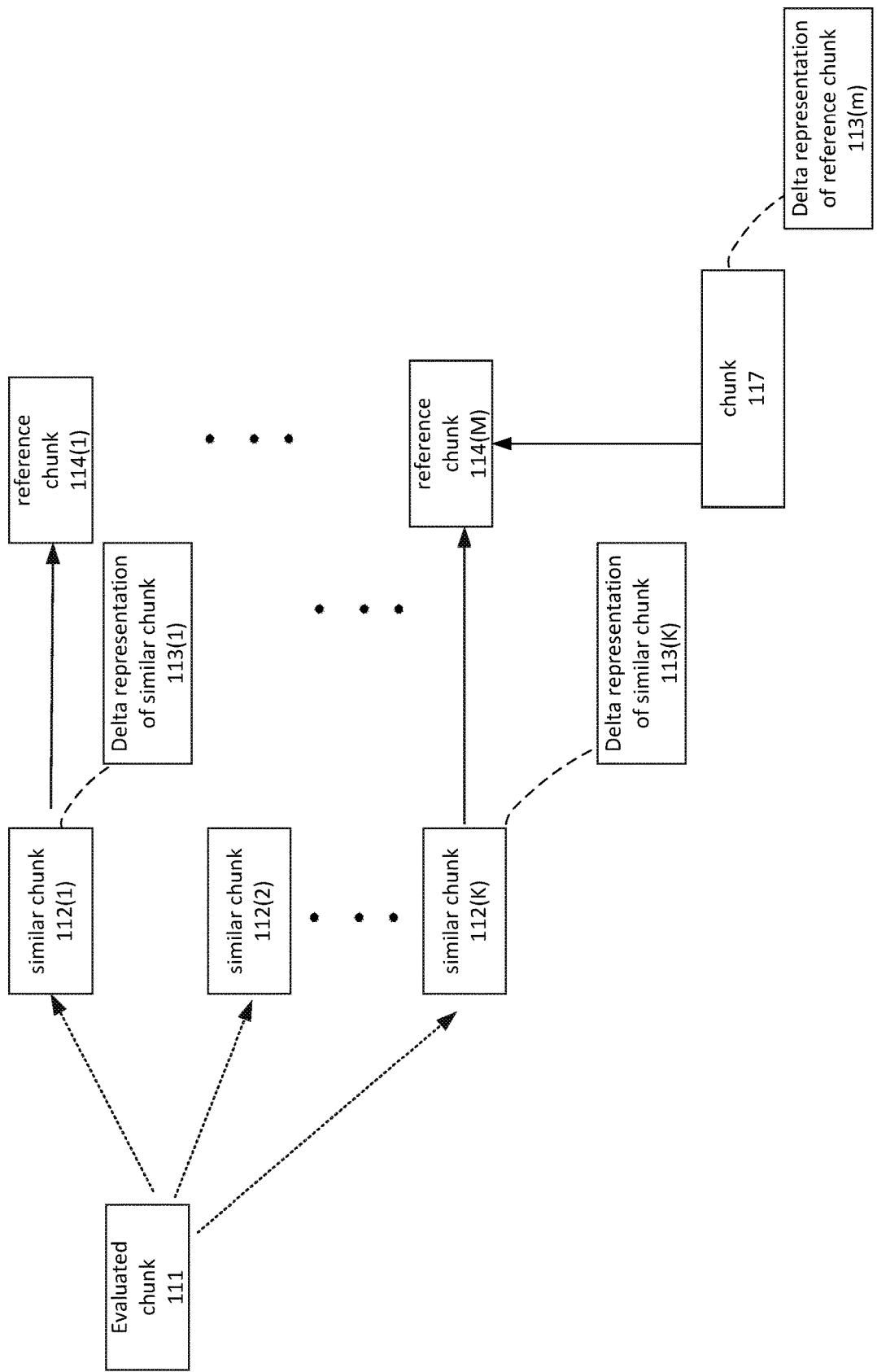
FIG. 1 is an example of a chunks.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided storage systems, methods, and non-transitory computer readable media for similarity based compressing an evaluated chunk. The chunk is a data chunk that includes data. A chunk is referred to as an evaluated chunk when its compression is being examined. The evaluated chunk may be an untied chunk or may be a tied chunk.

Hashing of data blocks is a tool used for data reduction that allows identifying redundant blocks. Similarity hashing uses hash functions that are not sensitive to small changes within the data blocks and preserves the chunk similarity, such that when applying the hash function on similar blocks, they will produce the same hash value with high probability. Similarity hashing can help identifying data blocks having slight changes. Known similarity hash functions include locality sensitive hashing (LSH) schemes, such as Minhash, SimHash, and idhash.

FIG. 1 illustrates example of an evaluated chunk 111 that is similar to K similar chunks 112(1)-112(K).

One or more similar chunks of the K similar chunks may be compressed based on reference chunks (see for example similar chunk 112(1) that is compressed based on reference chunk 114(1), and similar chunk 112(K) that is compressed based on reference chunk 114(M)).

One or more other similar chunks of the K similar chunks may not be compressed based on reference chunks (see for example similar chunk 112(2)). A reference chunk may be referenced by other chunks (see for example reference chunk 114(M) that is referenced by another chunk 117 that is also similar to reference chunk 114(M)).

The storage system may store a delta representation of the tied chunk—see for example delta representation (113(1)) of similar chunk 112(1), delta representation (113(K)) of similar chunk 112(K), and delta representation (113(m)) of chunk 117.

The size of data chunks stored in a storage system may be substantially reduced by referring to similar data chunks (reference chunks) that are already stored in the system, and storing only the difference (delta) between the data chunks and the corresponding reference chunks. The data stored in the system is split into variable-size chunks according to content of the data or into fixed size chunks according to logical offset. At least one similarity hash value is calculated per chunk and stored as a similarity metadata in a shared access storage of the storage system.

The level of similarity between two data chunks, can be measured by a similarity distance, for example, by using Jaccard similarity coefficient, which is statistics used for gauging the similarity and diversity of chunks. Levenshtein distance is a string metric that can be used to measure the difference between two sequences, and it can define the number of bits that are different between two data chunks. The level of similarity can be also calculated by the distance between two simhashes of two chunks.

According to embodiments of the invention, untied chunks are checked for potential similarity links to the most similar chunks, in order to determine the best data reduction approach for the untied chunks. Untied chunks are chunks that are not referring to a reference chunk and not referred by other chunks. The determination includes evaluating various data reduction parameters related to: the untied chunks, the corresponding similar chunks (chunks that are found to be similar to the untied chunks), corresponding reference chunks (chunks referenced by the similar chunks), data reduction parameters related to existing links between the similar chunks and their reference chunks, and the data reduction parameters related to potential linking between the untied chunks and one of the similar chunks that were found.

An untied chunk to be evaluated for the best data reduction approach can be: a received chunk that needs to be stored in the system, a reference chunk that becomes untied as part of the data reduction evaluation described herein, a received chunk that was remained untied in accordance to a determination of the data reduction evaluation described herein—a decision that might be changed at a later time when the data reduction approach is re-evaluated, a chunk that used to be a reference chunk for other chunks and all of the other chunks were deleted (or untied), or any other reason that caused the chunk to be untied.

The data reduction used for an evaluated chunk can be either a self-compression of the evaluated chunk, where the evaluated chunk remains untied, or tying the evaluated chunk to a reference chunk, by compressing the evaluated chunk against the reference chunk to produce a delta of content that exists only in the evaluated chunk and not shared with the reference chunk. The storage of the evaluated chunk, in the latter case, includes storing the compressed or non-compressed delta, and a reference to the reference chunk. Indirect linking is not applicable, i.e., a chunk cannot refer to another chunk that is already referring to a third chunk.

The evaluated untied chunk will be referred herein as a "first chunk", a similar chunk that is similar to the first chunk will be referred herein as a "second chunk", and a reference chunk being referenced by the second chunk will be referred herein as a "third chunk.

FIG. 1 illustrates an evaluated untied chunk 111 (first chunk), were K similar chunks 112(1)-112(K) (second chunks) were found for the evaluated chunk 111. Similar chunk 112(1) refers to a reference chunk 114(1) (third chunk) and similar chunk 112(K) refers to a reference chunk 114(M). Not all the similar chunks may refer to reference chunks, for example, similar chunk 112(2) does not refer to any reference chunk.

When a first (untied) data chunk is evaluated, the preferred type of storage is determined: self-compression or delta compression, wherein the latter is evaluated against one or more candidate similar chunks. Chunks stored in the storage system are checked for determining the most similar chunks, based on a similarity hash calculated for the first chunk and on stored similarity hashes of stored chunks. Based on one or more second chunks of the most similar chunks, there may be some possibilities for the most efficient storage of the first data chunk, that is depended not only on the first chunk, but also depends on other involved chunks.

If a second (similar) chunk is stored with its original data, i.e., not referencing to a third chunk, then—the second chunk may be selected as a reference chunk to the first chunk, and the first chunk may be compressed against the second chunk to produce a delta, i.e., a portion of data that is not shared between the two chunks, and only the delta is saved for the first chunk along with a pointer referring to the second chunk, that now becomes a reference chunk for the first chunk.

Other parameters may influence the decision to tie the first chunk to the second chunk in case when the second chunk is untied, for example: (i) the level of similarity between the first chunk and the second chunk; (ii) the compression ratio (the division of uncompressed size by compressed size) of the second chunk when self-compressed, as it might be decided not to use a chunk that does not compress well, as a reference chunk. The compression ratio of the second chunk may be saved as part of the metadata of the second chunk, when the second chunk was compressed; (iii) the compression ratio of the first chunk when self-compressed, as it might decided not to tie the first chunk when the compression ratio of the first chunk is very good (high). A good level of a compression ratio may be determined based on an average compression ratio of the data stored in the system, and may vary among different storage systems, or may be defined as a value that is higher than a ration threshold, e.g., above 2, above 1.5, etc.

However, if the second chunk is a referring chunk, i.e., already stored as a delta and reference to a third chunk, then the best storage approach should be considered for the first chunk, and reconsidered for the second chunk and the third chunk, given that the second chunk in its current type of storage, as a referring chunk, is not adjusted for serving as a reference chunk.

The storage options in the case where the most similar chunk is a referring chunk (in addition to the options mentioned above for an untied second chunk) may include: (i) Untying the second chunk from the third chunk, and tie the first chunk to the second chunk. The untying includes: decompressing the second chunk based on its delta and the content of the third chunk, compressing the first chunk against the second chunk, storing the first chunk as a delta and a reference to the second chunk, and self-compressing the second chunk. This option may leave the third chunk as untied to any other chunks, or tied to other chunks not including the second chunk; (ii) Use another second chunk from the most similar chunks, if there is an untied second chunk having at least a certain level of similarity; (iii) Self compress the first chunk without referring to any similar chunk.

The following parameters may be evaluated for determining which of the data reduction options is preferred.

A first parameter to be evaluated is the level of similarity between the second chunk and the third chunk (referred by the second chunk). This parameter may be stored as part of the storage metadata of the second chunk, or the parameter may be determined based on the size of the delta stored for the second chunk. A smaller delta implies a high similarity level, and vice-versa. A lower similarity level between the second and third chunks may increase the profitability of untying the second from the third chunk, so as to be able to tie the first chunk to the second chunk. A higher similarity level between the two chunks may decrease the profitability of untying the second from the third chunk, and not using the second chunk as the reference for the first chunk.

A first score of the first parameter, for the worthwhileness of untying the second chunk from the third chunk, may depend on the similarity level between the second and third chunks or just the size of the delta stored for the second chunk. For example, if the delta composes less than 10% of the original size of the second chunk, or if any other similarity gauge demonstrates a high similarity in the top decile, then—the first score is low, e.g., equal 1 out of 10. If the delta composes less than 90% of the original size of the second chunk, or if any other similarity gauge demonstrates a low similarity in the low decile, then—the first score is high, e.g., equal 10 out of 10. Any other similarity level at an intermediate decile, or inside a range of similarity level (e.g., between zero or other minimal overlapping to identical chunks) will be assigned with a corresponding score between 2-9.

A second parameter to be evaluated is the level of similarity between the first chunk and the second chunk. This parameter may be evaluated by executing an algorithm that measures the distance between the chunks, for example according to the similarity hashes of the two chunks. A lower similarity level between the first and second chunks may imply a lower profitability of tying the first chunk to the second chunk, and therefore—a lower profitability of untying the second from the third chunk. A higher similarity level between the two chunks may imply a higher profitability of tying the first chunk to the second chunk, and therefore—a higher profitability of untying the second from the third chunk.

A second score of the second parameter, for the worthwhileness of untying the second chunk from the third chunk, may depend on the similarity level between the first and second chunks. If the similarity level demonstrates a high similarity in the top decile, then—the second score is high, e.g., equal 10 out of 10. If the similarity level demonstrates a low similarity, e.g., in the low decile, then—the second score is low, e.g., equal 1 out of 10. The rest of the values of the score will be assigned for intermediate similarity levels.

A third parameter to be evaluated is the compression ratio of the third chunk, or in other words—the storage footprint of the third chunk. As a reference chunk, the third chunk is already self-compressed, and the compression ratio may be stored as part of the compression metadata of the third chunk when the chunk was compressed. A low (bad) compression ratio (high storage size) may suggest that the third chunk is not a good reference chunk, and therefore the profitability of untying the second chunk from the third chunk is increased.

A third score of the third parameter may be responsive to the compression ratio of the third chunk. A higher (bad) compression ratio produces a low score to untie the second chunk from the third chunk. For example, a compression ratio of 1.1 (reduction in size of only 10%) (worst compression) produces a high third score of 10 out of 10.

If the third chunk is referenced by other chunks besides the second chunk, then—the number of chunks referring to the third may influent this parameter, or otherwise—may construct another parameter to be evaluated. For example, the storage size of the third chunk can be divided to the number of referring chunks, so that the larger the number of referring chunk is, the lower the impact of untying the second chunk from the third chunk. For example, if there are nine chunks referring to the third chunk, and the total size of the third chunk is 32 KB, then there are total of ten chunks that participate in sharing the content (or at least parts of it), with an average of 3.2 KB per chunk. Untying the second chunk, will leave nine chunks participating in sharing the content, with an average share of 3.5 KB, so only 0.3 KB is wasted if the second chunk is untied from the third chunk, which may increase the profitability of untying.

A fourth parameter to be evaluated is the compression ratio of the first chunk if will be self-compressed, without referring to the second chunk (or to any other chunk). If the first chunk is a chunk that is already stored in the system, then—its compression ratio is known. Otherwise—the potential compressing rate may be estimated by compressing one or more samples of the first chunk. A good compression ratio lowers the profitability of untying the second chunk from the third chunk, and the fourth score is determined accordingly.

A fifth parameter is the compression ratio of the second chunk if will be self-compressed (after untying the second chunk from the third chunk). If the compression ratio is low (bad compression), then—the profitability of untying the second chunk is decreased, and the fifth score is determined accordingly.

The various evaluated scores of the various parameters are summed into a total score for untying the second chunk from the third chunk. Each of the scores may have an assigned weight when calculating the total score. For example, each of the first and second scores (related to similarities between chunks) may have a weight of 35% and each of the third to fifth parameters may have a weight of 10%. So the total score may be:

0.35*<first score>+0.35*<first score>+0.1*<third score>+0.1*<fourth score>+0.1*<fifth-score>

If the total score is above a threshold (e.g., above 5, above 7, 8, etc.) that indicates a high profitability of untying the second chunk from the third chunk, then the storage of the first chunk is done by referring the first chunk to the second chunk, the first chunk is compressed against the second chunk, and its content is saved as a delta and a reference to the second chunk.

A background process may scan untied chunks, by looking up for the most similar chunks, and repeat the above process of decisions.

The weights of the scores in the total score for untying the second chunk from the third chunk may be adjusted, by learning the correlation of the values of the various parameters and a decision to either untie or avoid untying the second chunk from the third chunk. A sample of decisions for untying (or keep the tie) is evaluated, e.g., one decision out of every thousand decisions is selected. The size of the three chunks, the first, second and third chunks is calculated for both cases: (i) the second chunk is untied from the third chunk, which leads to: compressing the first chunk against the second chunk, self-compressing the second chunk, and keeping the self-compression of the third chunk; (ii) the second chunk is maintained tied to the third chunk, which leads to self-compressing the first chunk.

If the sizes of the three chunks is lower when calculating according to the first case versus the size calculated according to the second case—then the decision to untie is correct, and the values of the parameters (or the scores) are associated with the decision to untie. If the sizes of the three chunks is higher when calculating according to the first case—then the decision to maintain the tie is correct, and the values of the scores are associated with the decision to maintain the tie.

When it is found that a sub-range of values of a certain parameter is highly correlated with a decision to untie, then the weight of the corresponding score may be increased. If a weak correlation is detected between a range of values of the certain parameter and a decision to untie—the weight of the parameter may be decreased.

Figure 2:
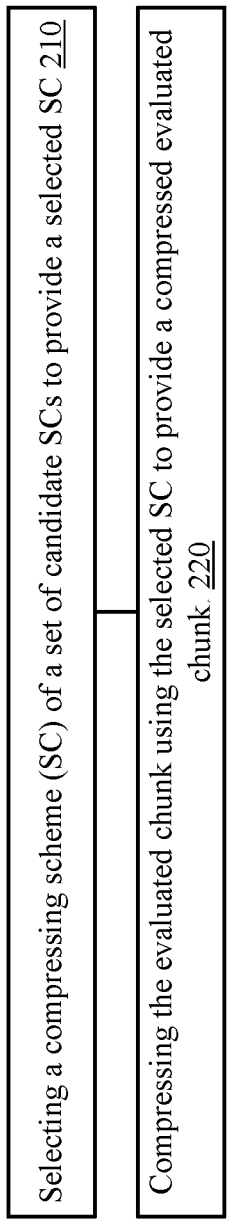
FIG. 2 is an example of a method.
Figure 3:
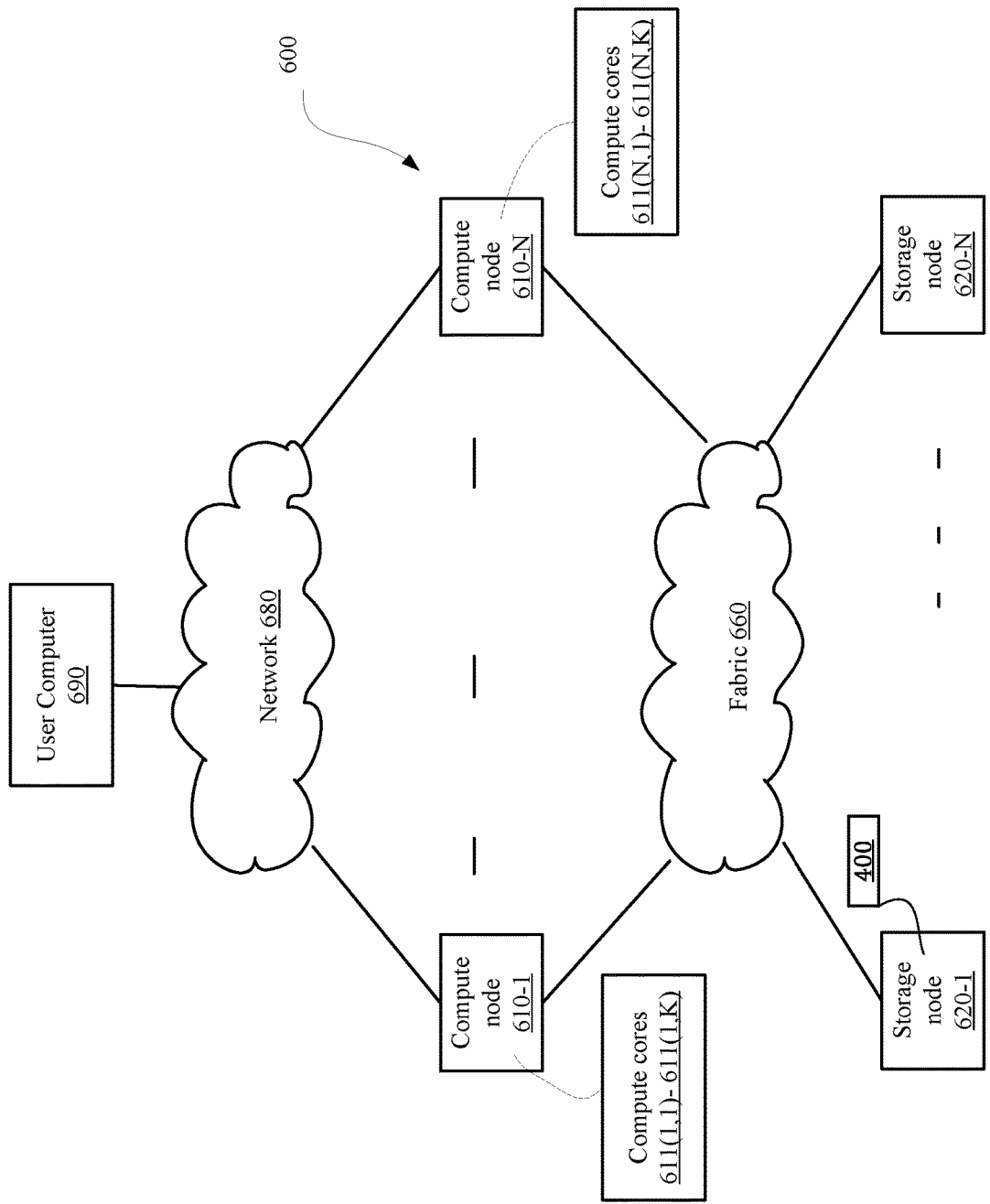
FIG. 3 is an example of a storage system and its environment.

FIG. 2 illustrates method 200 for compressing an evaluated chunk.

Method 200 may start by step 210 of selecting a compressing scheme (SC) of a set of candidate SCs to provide a selected SC.

It is assumed that the evaluated chunk is similar to a so-called similar chunk. The similar chunk is tied to a reference chunk by having the similar chunk compressed based on the reference chunk.

Step 210 may include evaluating candidate SCs of the set.

The selecting of step 210 may be responsive to a first relationship between (i) a similarity score indicative of a similarity between the evaluated chunk and the similar chunk, and (ii) a similarity score indicative of a similarity between the similar chunk and the reference chunk. Examples of similarity scores are provided above. Other similarity scores may be used. The similarity scores provide a hint regarding the effectiveness of the compression (and therefore—the profitability) provided by the two options: (i) compressing the evaluated chunk against the similar chunk; and (ii) compressing the similar chunk against the reference chunk.

The set may include a first candidate that may include untying the similar chunk from the reference chunk, and tying the evaluated chunk to the similar chunk by compressing the evaluated chunk based on the similar chunk. The first candidate may be a preferred option when the similarity score indicative of a similarity between the evaluated chunk and the similar chunk is higher (or higher by at least a certain threshold) than the similarity score indicative of a similarity between the similar chunk and the reference chunk. When the first relationship is higher than a certain threshold (at least above 1), then the first candidate may be a preferred option, although other parameters may influent the decision.

The set may include a second candidate SC of the set that may include self-compressing the evaluated chunk without tying the evaluated chunk to the similar chunk. When the first relationship is lower than a certain threshold (at least below 1), then the second candidate may be a preferred option, although other parameters may influent the decision.

Step 210 may include selecting between the first candidate and the second candidate.

Step 210 may include selecting between other candidates of the set.

Step 210 may include selecting between the first candidate, the second candidate, and one or more candidates of the set.

Step 210 may include selecting between the first candidate and one or more candidates of the set.

Step 210 may include selecting between the second candidate and one or more candidates of the set.

Step 210 may be followed by step 220 of compressing the evaluated chunk using the selected SC to provide a compressed evaluated chunk.

The selecting may also be responsive to a second relationship between (i) an aggregate size of storage required to support the first candidate SC, and (ii) an aggregate size of storage required to support the second candidate SC. While the first relationship provides an estimation of the best compression option, the second relationship may evaluate the actual sizes resulted by each compression option. Since the evaluation of the first relationship may be easier and may need fewer computing resources, then—the second relationship may be evaluated only on samples of evaluated chunks, e.g., every thousand evaluated chunks, a compression of the two types (to provide the two aggregate sizes for first and second SC) may be performed and the results will be compared. If the decision for selecting a candidate is changed based on the second relationship, then the selecting will prefer the result of the second relationship over the result of the first relationship. Furthermore, the weight of the first relationship comparing to other parameters, in future decisions (a selecting step made for other evaluated chunks) may be adjusted (e.g., reduced). The aggregate size for supporting the first candidate SC includes at least: the size of the self-compressed similar chunk plus the size of the delta compression of the evaluated chunk against the similar chunk. The aggregate size for supporting the second candidate SC includes at least: the size of the self-compressed evaluated chunk plus the size of the delta compression of the similar chunk against the reference chunk. Size changes related to untying from the reference chunk may also be considered as described hereinafter.

Step 210 may include determining an evaluated chunk delta representation obtained when the evaluated chunk is compressed based on the similar chunk.

The similar chunk may be compressed based on the reference chunk to provide a similar chunk delta representation. Step 210 may also be based on a third relationship between the evaluated chunk delta representation and the similar chunk delta representation.

Step 210 may be based on a number of chunks that are tied to the reference chunk. For example, if there are multiple chunks (above a certain number) referring to the reference chunk, then the influence of untying the similar chunk may be neglected, and may add weight to preferring to select the first candidate SC.

Step 210 may be based on a score that is based on multiple compression related parameters.

The score may be a function of weights and values of the multiple compression related parameters, wherein the weights are adjustable.

The evaluated chunk may also be similar to another similar chunk that is self-compressed and the set may include a third candidate that includes tying the evaluated chunk to the other similar chunk.

Method 200 may be executed in real time and the data may be of sizes that may exceed 1 Kbytes. In real time may mean within a fraction of a second, or a second or few seconds—or within any short period of time.

FIG. 6 shows an example diagram of a storage system 600, user computer 690 and an example of an implementation of method 200, according to the disclosed embodiments.

The storage system 600 includes a number of N compute nodes 610-1 through 610-N (hereinafter referred to individually as a compute node 610 and collectively as compute nodes 610, merely for simplicity purposes, N is an integer equal to or greater than 1). The compute nodes include (or may execute) multiple compute cores each (for example 611(1,1)-611(1,K) of compute node 610-1 and 611(N,1)-611(N,K) of compute node 610-N).

The storage system 600 also includes a number of M storage nodes 620-1 through 620-M (hereinafter referred to individually as a storage node 620 and collectively as storage nodes 620, merely for simplicity purposes, M is an integer equal to or greater than 1). The computer nodes 610 and the storage nodes 620 are connected through a communication fabric 660. M may equal N or may differ from N. The filesystem, the filesystem location, the data written to the filesystem location and the TD may be stored in the storage nodes. The storage nodes store the data chunks, and the similarity hashes, that are accessible by the compute nodes, and are required for evaluating similarities.

In an embodiment, a compute node 610 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 610 does not require any dedicated hardware.

A compute node 610 is configured to perform tasks related the execution of method 200. In an embodiment, each compute node 610 may interface one or more user devices (such as user device 690). A user device may host one or more user applications.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for compressing an evaluated chunk, the method comprising:
    calculating similarity hashes for a plurality of chunks;

wherein one or more of the plurality of chunks are tied to a corresponding reference chunk and one or more of the plurality of chunks are not tied to any corresponding reference chunk;

calculating a similarity hash for the evaluated chunk;

determining a most similar chunk of the plurality of chunks based on the similarity hashes of the plurality of chunks and on the calculated similarity hash of the evaluated chunk;

calculating a first similarity score indicative of a similarity between the most similar chunk and a first reference chunk, wherein the most similar chunk is previously tied to the first reference chunk;

calculating a second similarity score indicative of a similarity between the most similar chunk and the evaluated chunk, wherein the second similarity score is based on the calculated similarity hash of the evaluated chunk and on a similarity hash of the most similar chunk;

determining a first relationship between the first similarity score and the second similarity score;

selecting a compressing scheme (SC) of a set of candidate SCs based on evaluating at least a first candidate SC and a second candidate SC in the set of candidate SCs using at least the first relationship;

wherein the selected SC is one of:

the first candidate SC including a compression process that comprises:

(i) untying the most similar chunk from the first reference chunk (ii) producing a delta of the content of the evaluated chunk that is not shared with the most similar chunk by compressing the evaluated chunk based on the most similar chunk, and (iii) storing the compressed evaluated chunk that includes the delta and a reference to the most similar chunk; and the second candidate SC including a compression process that comprises self-compressing the evaluated chunk without tying the evaluated chunk to the most similar chunk; and compressing the evaluated chunk using the selected SC.

2. The method according to claim 1 wherein the selecting is also responsive to a second relationship between (i) an aggregate size of storage required to support the first candidate SC, and (ii) an aggregate size of storage required to support the second candidate SC.

3. The method according to claim 1 wherein the selecting comprises determining an evaluated chunk delta representation obtained when the evaluated chunk is compressed based on the most similar chunk.

4. The method according to claim 3 wherein the most similar chunk is compressed based on the reference chunk to provide a similar chunk delta representation; and wherein the selecting is based on a third relationship between the evaluated chunk delta representation and the similar chunk delta representation.

5. The method according to claim 1 wherein the selecting is based on a number of chunks that are tied to the reference chunk.

6. The method according to claim 1 wherein the selecting is based on a score that is based on multiple compression related parameters.

7. The method according to claim 6 wherein the score is a function of weights and values of the multiple compression related parameters, wherein the weights are adjustable.

8. The method according to claim 1 wherein the evaluated chunk is also similar to another similar chunk that is self-compressed; wherein a third SC of the set comprises tying the evaluated chunk to the other similar chunk.

9. A non-transitory computer readable medium for compressing an evaluated chunk, the non-transitory computer readable medium stores instructions for:

calculating similarity hashes for a plurality of chunks;

wherein one or more of the plurality of chunks are tied to a corresponding reference chunk and one or more of the plurality of chunks are not tied to any corresponding reference chunk;

calculating a similarity hash for the evaluated chunk;

determining a most similar chunk of the plurality of chunks based on the similarity hashes of the plurality of chunks and on the calculated similarity hash of the evaluated chunk;

calculating a first similarity score indicative of a similarity between the most similar chunk and a first reference chunk, wherein the most similar chunk is previously tied to the first reference chunk;

calculating a second similarity score indicative of a similarity between the most similar chunk and the evaluated chunk, wherein the second similarity score is based on the calculated similarity hash of the evaluated chunk and on a similarity hash of the most similar chunk;

determining a first relationship between the first similarity score and the second similarity score;

selecting a compressing scheme (SC) of a set of candidate SCs based on evaluating at least a first candidate SC and a second candidate SC in the set of candidate SCs using at least the first relationship;

wherein the selected SC is one of:

the first candidate SC including a compression process that comprises:

(i) untying the most similar chunk from the first reference chunk (ii) producing a delta of the content of the evaluated chunk that is not shared with the most similar chunk by compressing the evaluated chunk based on the most similar chunk, and (iii) storing the compressed evaluated chunk that includes the delta and a reference to the most similar chunk; and the second candidate SC including a compression process that comprises self-compressing the evaluated chunk without tying the evaluated chunk to the most similar chunk; and compressing the evaluated chunk using the selected SC.

10. The non-transitory computer readable medium according to claim 9 wherein the selecting is also responsive to a second relationship between (i) an aggregate size of storage required to support the first candidate SC, and (ii) an aggregate size of storage required to support the second candidate SC.

11. The non-transitory computer readable medium according to claim 9 wherein the selecting comprises determining an evaluated chunk delta representation obtained when the evaluated chunk is compressed based on the most similar chunk.

12. The non-transitory computer readable medium according to claim 11 wherein the most similar chunk is compressed based on the reference chunk to provide a similar chunk delta representation and wherein the selecting is based on a third relationship between the evaluated chunk delta representation and the similar chunk delta representation.

13. The non-transitory computer readable medium according to claim 9 wherein the selecting is based on a number of chunks that are tied to the reference chunk.

14. The non-transitory computer readable medium according to claim 9 wherein the selecting is based on a score that is based on multiple compression related parameters.

15. The non-transitory computer readable medium according to claim 14 wherein the score is a function of weights and values of the multiple compression related parameters, wherein the weights are adjustable.

16. The non-transitory computer readable medium according to claim 9 wherein the evaluated chunk is also similar to another similar chunk that is self-compressed; wherein a third SC of the set comprises tying the evaluated chunk to the other similar chunk.

17. A compute core of a processing system, the compute core is configured to:
- calculate similarity hashes for a plurality of chunks; wherein one or more of the plurality of chunks are tied to a corresponding reference chunk and one or more of the plurality of chunks are not tied to any corresponding reference chunk;
- calculate a similarity hash for the evaluated chunk;
- determine a most similar chunk of the plurality of chunks based on the similarity hashes of the plurality of chunks and on the calculated similarity hash of the evaluated chunk;
- calculate a first similarity score indicative of a similarity between the most similar chunk and a first reference chunk, wherein the most similar chunk is previously tied to the first reference chunk;
- calculating a second similarity score indicative of a similarity between the most similar chunk and the evaluated chunk, wherein the second similarity score is based on the calculated similarity hash of the evaluated chunk and on a similarity hash of the most similar chunk;
- determine a first relationship between the first similarity score and the second similarity score;
- select a compressing scheme (SC) of a set of candidate SCs based on evaluating at least a first candidate SC and a second candidate SC in the set of candidate SCs using at least the first relationship;
- wherein the selected SC is one of:
  - the first candidate SC including a compression process that comprises:
    - (i) untying the most similar chunk from the first reference chunk
    - (ii) producing a delta of the content of the evaluated chunk that is not shared with the most similar chunk by compressing the evaluated chunk based on the most similar chunk, and
    - (iii) storing the compressed evaluated chunk that includes the delta and a reference to the most similar chunk; and
  - the second candidate SC including a compression process that comprises self-compressing the evaluated chunk without tying the evaluated chunk to the most similar chunk; and
- compress the evaluated chunk using the selected SC.

\* \* \* \* \*